Patented Mar. 26, 1935

1,995,557

UNITED STATES PATENT OFFICE 1,995,557

PROCESS OF PREPARING SULPHURIC ACID ESTERS OF LEUCO DERIVATIVES OF VAT DYESTUFFS

Ludwig Zeh and Wilhelm Bauer, Leverkusen-Wiesdorf, and Bernhard Bollweg, Leverkusen-I. G. Werk, Germany, assignors, by mesne assignments, to Durand & Huguenin A.-G., Basel, Switzerland, a corporation of Switzerland No Drawing. Application September 20, 1932, Serial No. 634,076. In Germany September 21, 1931

8 Claims. (Cl. 260—36)

The present invention relates to a process of preparing sulphuric acid esters of leuco derivatives of vat dyestuffs.

In U. S. Patent 1,448,251 there is described a process for the manufacture of ester-like, water soluble compounds of vat dyestuffs by causing leuco compounds of the latter to react with sulphur trioxide in the presence of a tertiary organic base.

In accordance with the present invention the same products are obtained in a considerably simpler manner and without isolating the leuco derivatives. The method of working of the present invention is by causing reduction of the vat dyestuff by means of carbon bisulphide in the presence of a tertiary organic base and of ammonia and/or a primary aliphatic or hydroaromatic amine, and, after reduction is complete, adding to the reaction mixture sulphur trioxide or an agent containing free sulphur trioxide or being capable of splitting off the latter under the conditions of working. The total process is performed under substantially anhydrous conditions and while avoiding the presence of oxygen as far as possible.

The more detailed method of working may be as follows:—

The vat dyestuff is dissolved or suspended in an appropriate tertiary organic base in the presence or absence of a suitable organic solvent or diluent being inert to the starting materials, such as chloro-benzene, ortho-dichlorobenzene etc., and carbon bisulphide and water free ammonia are added to the reaction mixture. Reduction of the vat dyestuff to its leuco derivative soon occurs at normal or even lower temperature. Higher temperatures are likewise operable but unnecessary. As an alternative water free ammonia gas may be led into the mixture of carbon bisulphide and of a tertiary organic base, the vat dyestuff to be reduced may be added and the mixture stirred while excluding air, until reduction is complete. As a further alternative the ammonia may be replaced partly or totally by primary aliphatic or hydroaromatic amines, such as methylamine, ethylamine, butylamine, hexahydroaniline, tetrahydronaphthylamines etc.

In some cases it will be advantageous, but not necessary, to add sulphur to the reaction mixture. Likewise the addition of aliphatic or hydroaromatic secondary amines is frequently of advantage in case ammonia is applied in conjunction with the tertiary organic base and the carbon bisulphide.

As tertiary organic bases we prefer tertiary heterocyclic bases or hydrogenated tertiary isocyclic bases, such as pyridine, homologues thereof, quinoline, hexahydrodimethylaniline etc.

When reduction is complete, an esterifying agent is added to the reaction mixture without isolating the leuco compound. As esterifying agents may be applied sulphur trioxide or agents containing free sulphur trioxide or being capable of splitting off the latter under the conditions of working, such as chlorosulphonic acid, esters thereof, anhydrous sodium salt of chlorosulphonic acid, fuming sulphuric acid etc., and it may be mentioned that we generally prefer to apply the esterifying agent in admixture with a tertiary organic base. The esterifying agents are advantageously applied in such an amount that more than two molecular proportions of sulphur trioxide are available on one molecular proportion of the leuco derivative of the vat dyestuff to be esterified. Esterification already performs at low temperatures, but slightly elevated temperatures are likewise operable and tend to accelerate the esterification process. Generally, we prefer to apply temperatures between about 10 and about 70° C. The sulphuric acid esters are thus obtained in form of their salts with the tertiary base applied. The reaction mixture is best worked up by adding an alkali, such as sodium or potassium carbonate to the reaction mixture, whereby an alkali metal salt of the ester is formed, distilling off the tertiary base in vacuo or by steam distillation, dissolving the residue in water, filtering and salting out.

The following examples illustrate the invention, without, however, limiting it thereto, the parts being by weight:—

Example 1

587 parts of tetrabromoindigo are distributed in 2500 parts of anhydrous pyridine containing 160 parts of carbon bisulphide. The air in the reaction vessel is then replaced by nitrogen and, while stirring and cooling, anhydrous ammonia gas is led through the reaction mixture, until the reduction of the tetrabromoindigo is complete.

The mixture thus obtained is then stirred into a mixture of 700 parts of chlorosulphonic acid and 2800 parts of pyridine. Esterification is completed by slightly heating.

The process can also be performed by introducing 578 parts of tetrabromoindigo into a mixture obtained by mixing 2000 parts of pyridine with 152 parts of carbon bisulphide and 68 parts of anhydrous ammonia while cooling. After reduction is complete, esterification of the reduction product may be performed as described above.

The pyridine salt of the leuco sulphuric acid ester of tetrabromoindigo can be transformed into its stable and water soluble sodium salt in the usual manner.

*Example 2*

578 parts of tetrabromoindigo are stirred into a mixture of 76 parts of carbon bisulphide, 2000 parts of pyridine and 146 parts of butylamine. After a short time reduction is complete and the leuco compound partly separates in a crystalline form. The reaction mixture is then poured into a mixture of 600 parts of chlorosulphonic acid and 2000 parts of pyridine, and the reaction product transformed into its sodium salt in the usual manner.

*Example 3*

286 parts of 6.6'-diethoxythioindigo are suspended in a mixture of 3000 parts of pyridine and 76 parts of carbon bisulphide. Anhydrous ammonia gas is led into the mixture at room temperature, until a yellowish solution of the leuco derivative of the diethoxythioindigo has formed. The reaction mixture is then mixed with 3000 parts of pyridine and 750 parts of chlorosulphonic acid at 20–50° C.

*Example 4*

34 parts of anhydrous ammonia gas are led into a mixture of 76 parts of carbon bisulphide and 3000 parts of pyridine. 386 parts of finely divided 7.7'-dinitrothioindigo are then added. After the reduction is complete, esterification is performed by means of a mixture of 3000 parts of pyridine and 800 parts of chlorosulphonic methylester. There is obtained the leuco sulphuric acid ester of 7.7'-dinitrothioindigo, which is transformed into its sodium salt in the usual manner.

By reduction in an alkaline medium the 7.7'-dinitrothioindigo-ester can easily be transformed into the leuco sulphuric acid ester of 7.7'-diamino-thioindigo.

*Example 5*

500 parts of 4.4'-dimethyl-5.7-6'-trichlorothioindigo and 20 parts of piperidine are stirred into a mixture obtained by leading 68 parts of ammonia gas into a solution of 160 parts of carbon bisulphide in 4000 parts of pyridine. After reduction is complete, esterification is performed as described in the above examples, and the leuco sulphuric ester obtained transformed into its sodium salt in the usual manner.

When omitting the piperidine reduction likewise performs, but the reaction is accelerated by the presence of the piperidine.

*Example 6*

2000 parts of pyridine and 152 parts of carbon bisulphide are introduced into a reaction vessel, in which the air has been displaced by nitrogen. 68 parts of anhydrous ammonia gas are then led through the mixture at a temperature of 5–10° C., whereafter 386 parts of the dyestuff of the formula:—

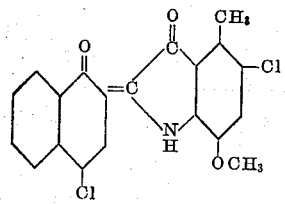

are stirred in. Under self-heating there is almost immediately formed a yellowish solution of the leuco compound, which solution is brought, while excluding air, into a mixture of 4000 parts of pyridine and 900 parts of chlorosulphonic acid. The esterification reaction is completed by slowly heating the mixture to 40–50° C. There is obtained the pyridine salt of the acid sulphuric acid ester of the leuco derivative of the dyestuff above mentioned. In order to transform the pyridine salt into the sodium salt, the reaction mixture is subjected to a steam distillation after having added 1400 parts of sodium carbonate to the mixture. The sodium salt of the ester thus obtained can be isolated by salting out with sodium chloride.

When replacing in this example the dyestuff of the formula given by 3.4.8.9-dibenzopyrenequinone, the sodium salt of the acid sulphuric acid ester of the leuco derivative of 3.4.8.9-dibenzopyrenequinone is obtained in an excellent yield.

*Example 7*

450 parts of the dyestuff of the formula:—

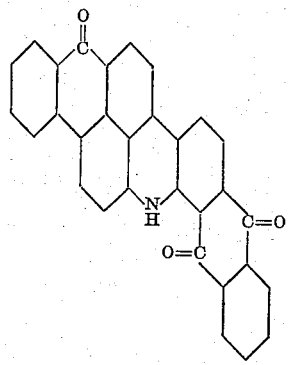

(see British specification No. 24 604/1908) are stirred into a solution of 200 parts of carbon bisulphide in 2500 parts of pyridine. 75 parts of anhydrous ammonia gas are then led through the mixture at 10° C. After that the mixture is slowly heated to 30–40° C. while leading a current of nitrogen over the mixture. After reduction is complete, a mixture of 1100 parts of chlorosulphonic acid and 5000 parts of pyridine is added and the reaction mixture heated to 45° C. The main part of the pyridine is then distilled off in vacuo, the residue poured into cold water, the reaction product, which forms reddish-brown crystals is filtered by suction and washed. It can be transformed into the sodium salt in the usual manner.

Instead of the chlorosulphonic acid or its esters used in the above examples, free sulphur trioxide or agents containing the same or other agents being capable of splitting off sulphur trioxide under the conditions of working, such as salts of chlorosulphonic acid (alkali metal salts, for example, such as sodium—or potassium chlorosulphonate) may be applied with a good result.

We claim:—

1. The process which comprises reducing a vat dyestuff to its leuco compound by means of carbon bisulphide in the presence of a tertiary organic base and of a compound of the group consisting of ammonia and primary aliphatic and hydroaromatic amines, and esterifying the reaction product without isolating it by the addition to the reaction mixture of an esterifying agent of the group consisting of sulphur trioxide, and agents being capable of splitting off free sulphur trioxide under the conditions of working, the total process being performed under substantially anhydrous conditions and in the absence of free oxygen.

2. The process which comprises reducing a vat dyestuff to its leuco compound by means of carbon bisulphide in the presence of ammonia and a compound of the group consisting of tertiary heterocyclic bases and hydrogenated tertiary isocyclic bases, and esterifying the leuco derivative of the vat dyestuff thus obtained without isolating it by the addition to the reaction mixture of an esterifying agent of the group consisting of sulphur trioxide, agents containing free sulphur trioxide and agents being capable of splitting off sulphur trioxide, the esterification being performed at a temperature between about 10 and about 70° C., and the total process being performed under substantially anhydrous conditions and in the absence of free oxygen.

3. The process which comprises reducing a vat dyestuff to its leuco compound by means of carbon bisulphide in the presence of ammonia and pyridine, and esterifying the leuco derivative of the vat dyestuff thus obtained without isolating it by the addition to the reaction mixture of a compound of the group consisting of chlorosulphonic acid and esters thereof, the esterification being performed at a temperature between about 10 and about 70° C., and the total process being performed under substantially anhydrous conditions and in the absence of free oxygen.

4. The process which comprises distributing a vat dyestuff in pyridine, adding carbon bisulphide, leading a current of ammonia gas through the mixture, until reduction of the vat dyestuff to its leuco compound is complete, and mixing the reaction mixture thus obtained with a mixture of chlorosulphonic acid and pyridine, the temperature of the mixture thus obtained being maintained between about 10 and about 70° C.

5. A process as claimed in claim 4, in which tetrabromoindigo is applied as the vat dyestuff to be reduced and esterified.

6. A process as claimed in claim 4, in which the dyestuff of the formula:—

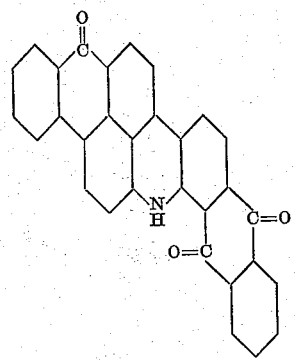

is applied as the vat dyestuff to be reduced and esterified.

7. The process which comprises leading a current of ammonia gas through a mixture of pyridine and carbon bisulphide, adding a vat dyestuff, stirring the mixture, until reduction of the vat dyestuff to its leuco compound is complete and mixing the reaction mixture thus obtained with a mixture of chlorosulphonic acid and pyridine, the temperature of the mixture thus obtained being maintained between about 10 and about 70° C.

8. A process as claimed in claim 7, in which tetrabromoindigo is applied as the vat dyestuff to be reduced and esterified.

LUDWIG ZEH.
WILHELM BAUER.
BERNHARD BOLLWEG.